US008266955B2

(12) United States Patent
Lee et al.

(10) Patent No.: US 8,266,955 B2
(45) Date of Patent: Sep. 18, 2012

(54) TIRE MONITORING DEVICE AND SYSTEM

(75) Inventors: Kyu Cheol Lee, Gyeonggi-do (KR); Sung Sun Uh, Gyeonggi-do (KR); Hee Yong Jung, Seoul (KR)

(73) Assignee: Seetron, Inc., Gyeonggi-do (KR)

( * ) Notice: Subject to any disclaimer, the term of this patent is extended or adjusted under 35 U.S.C. 154(b) by 0 days.

(21) Appl. No.: 12/958,810

(22) Filed: Dec. 2, 2010

(65) Prior Publication Data

US 2011/0132081 A1  Jun. 9, 2011

(30) Foreign Application Priority Data

Dec. 3, 2009  (KR) .................. 10-2009-0119392

(51) Int. Cl.
*B60C 23/02* (2006.01)

(52) U.S. Cl. ................. 73/146.5; 340/442; 340/444

(58) Field of Classification Search .......... 73/146–146.8
See application file for complete search history.

(56) References Cited

U.S. PATENT DOCUMENTS

| | | | | |
|---|---|---|---|---|
| 5,838,229 A | * | 11/1998 | Robinson, III | 340/442 |
| 6,204,758 B1 | * | 3/2001 | Wacker et al. | 340/444 |
| 6,259,361 B1 | * | 7/2001 | Robillard et al. | 340/447 |
| 6,518,876 B1 | * | 2/2003 | Marguet et al. | 340/447 |
| 6,657,540 B2 | * | 12/2003 | Knapp | 340/442 |
| 6,731,205 B2 | * | 5/2004 | Schofield et al. | 340/444 |
| 7,427,915 B2 | * | 9/2008 | Ogawa et al. | 340/442 |
| 2006/0044125 A1 | | 3/2006 | Pierbon | |
| 2009/0299656 A1 | * | 12/2009 | Koguchi | 702/42 |

* cited by examiner

*Primary Examiner* — Andre Allen
(74) *Attorney, Agent, or Firm* — Womble Carlyle

(57) ABSTRACT

A tire monitoring device may be used in conjunction with a tire monitoring system for a vehicle. The tire monitoring device includes a tire monitoring sensor unit having a state monitoring sensor monitoring a tire state, such as a tire pressure, and a first acceleration sensor and a second acceleration sensor respectively measuring accelerations in first and second directions on a plane perpendicular to a wheel axis, and a controller. The controller is configured to determine whether a wheel is on the left or right side of the vehicle on the basis of a relationship between alternating signals of the first acceleration sensor and the second acceleration sensor and determining whether or not a tire event has occurred with reference to a calculated value based on the accelerations measured by the first acceleration sensor and the second acceleration sensor. The tire monitoring device performs minimum operation required for automatic tire location recognition, thereby minimizing battery consumption and reducing the calculation load of the tire monitoring device itself and a central control unit.

20 Claims, 5 Drawing Sheets

TIRE MONITORING DEVICE AND SYSTEM

CROSS-REFERENCE TO RELATED APPLICATIONS

This application claims priority to and the benefit of Korean Patent Application No. 2009-119392, filed Dec. 3, 2009, the disclosure of which is incorporated herein by reference in its entirety.

BACKGROUND

1. Field of the Invention

The present invention relates to a tire monitoring device and system capable of automatically locating a tire.

2. Discussion of Related Art

In general, a tire monitoring system (TMS) is a safety apparatus enabling continuous monitoring of pressure, temperature, etc. of tires during operation of a vehicle. The TMS is intended to measure variables such as pressure and temperature of tires, and warn the driver to remove a dangerous factor and ensure safety when the variables indicate an abnormal state. Such a TMS generally has a sensor device installed in each wheel of a vehicle and including a microprocessor and a radio frequency (RF) transmitter, and a central control unit including an RF receiver connected with an antenna.

However, when tire exchange or replacement is performed, it is very troublesome and takes much time to register the changed state in the central control unit, and also an input error may ruin the safety function. Thus, when a tire exchange or tire replacement event occurs, it is preferred to automatically detect the event and automatically identify and register the position of a tire, which is referred to as auto-location.

In the case of a car, a pair of accelerometers measuring accelerations in orthogonal directions is generally installed to determine whether a vehicle wheel is on the left or right side on the basis of a phase difference between sine waves of measured acceleration values caused by the acceleration of gravity. Such a method has been fully disclosed in U.S. Patent Laid-Open Publication No. 2006/0044125, U.S. Pat. No. 6,204,758.

However, a sensor device including an acceleration sensor generally operates on a built-in battery, and continuous auto-location and signal transmission shorten battery life. Furthermore, auto-location is not needed in normal times except immediately after a tire exchange (sometimes called "tire rotation") event or tire replacement event (collectively "tire event"), and rather, continued auto-location may generate a mis-recognition due to an erratic driving environment or noise. Thus, it is necessary to perform auto-location only when needed and to suppress operation for auto-location in a sleep mode to prevent unnecessary battery consumption.

SUMMARY OF THE INVENTION

The present invention is directed to providing a tire monitoring device and system performing auto-location using acceleration sensors in two directions only when a tire replacement or tire exchange event occurs.

One aspect of the present invention provides a tire monitoring system including: a plurality of tire monitoring devices including a tire monitoring sensor unit having a state monitoring sensor monitoring a tire state and a first acceleration sensor and a second acceleration sensor respectively measuring accelerations in first and second directions on a plane perpendicular to a wheel axis, a radio frequency (RF) transmitter, and a controller determining whether a wheel is on the left or right side on the basis of a relationship between alternating signals of the first acceleration sensor and the second acceleration sensor and determining whether or not a tire event has occurred with reference to a calculated value based on the accelerations measured by the first acceleration sensor and the second acceleration sensor, and attached to wheels; and a central control unit including a receiver receiving a signal from the RF transmitter and mounted on a vehicle.

The first direction may be a tangential direction of the wheels, and the second direction may be a centrifugal direction of the wheels.

The controller may start an operation of recognizing whether a tire is on the left or right side or control a transmission mode of the RF transmitter according to whether or not a tire event has occurred.

The calculated value may be the sum of absolute values of the accelerations measured by the first acceleration sensor and the second acceleration sensor, and the controller may determine that a tire event has occurred when the calculated value is equal to or less than a reference value for duration of a first period.

When a tire event has occurred and the calculated value is equal to or larger than the reference value, the controller may perform an operation of recognizing whether the RF transmitter is on the left or right side.

The tire monitoring devices may include a pressure sensor.

The controller may have a memory having a tire event field whose flag value varies according to whether or not a tire event has occurred, and check the tire event field to start an operation of recognizing whether a tire is on the left or right side or determine a transmission mode of the RF transmitter.

BRIEF DESCRIPTION OF THE DRAWINGS

The above and other objects, features and advantages of the present invention will become more apparent to those of ordinary skill in the art by describing in detail embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice, but do not limit the present invention.

Figure 1:
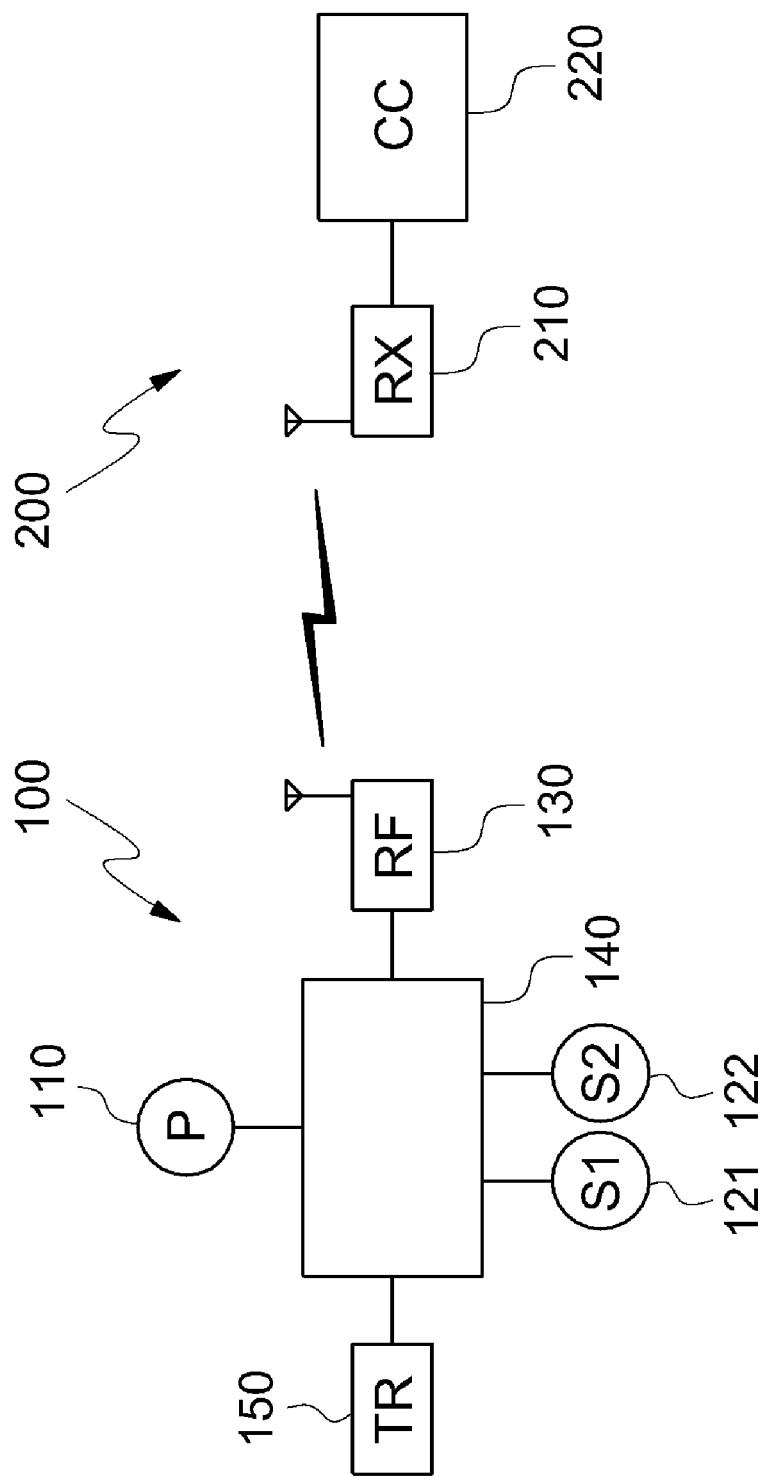
FIG. 1 is a block diagram of a tire monitoring system according to an embodiment of the present invention.

FIG. 1 is a block diagram of a tire monitoring system according to an exemplary embodiment of the present invention. The tire monitoring system includes a tire monitoring device 100 installed in each wheel, and a central control unit 200 installed on a vehicle and performing radio frequency (RF) transmission and reception with the tire monitoring device 100.

The tire monitoring device 100 includes a pressure sensor 110 measuring pressure of a tire, a first acceleration sensor 121 measuring acceleration in a first direction, a second acceleration sensor 122 measuring acceleration in a second direction, an RF transmitter 130, and a controller 140 controlling these components. Although not shown in the drawing, the tire monitoring device 100 further includes a battery, a required amplifier, a filter, etc., and other measurement sensors such as a temperature sensor may be added. The controller 140 may include a memory storing data, commands, etc., and a transponder 150 can be included to respond to a specific external signal.

The central control unit 200 includes an RF receiver 210, and a central processor 220 storing a received signal and controlling a display operation.

Figure 2:
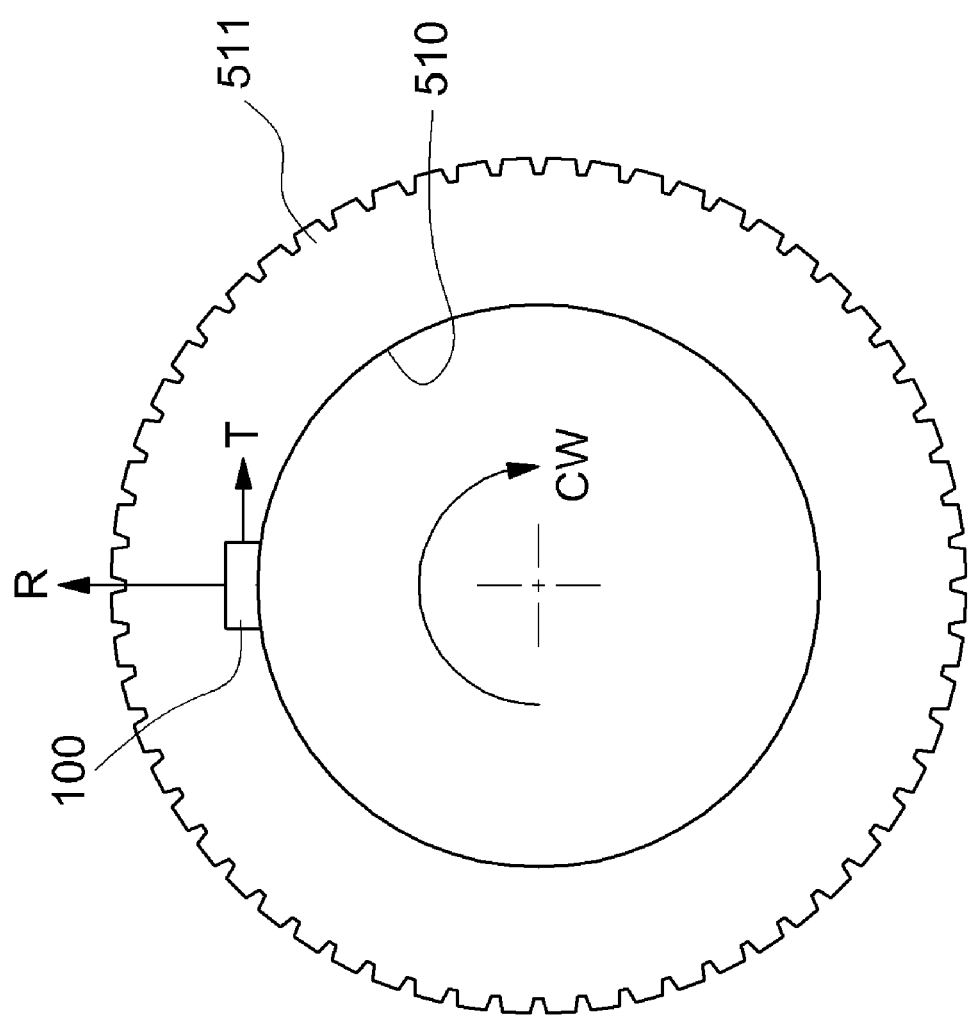
FIG. 2 illustrates an installed state of a tire monitoring device according to an embodiment of the present invention.

As shown in FIG. 2, the tire monitoring device 100 is generally installed on a wheel hub 510 in a tire 511. The acceleration sensors 121 and 122 measure accelerations in different directions on a plane perpendicular to a wheel shaft, that is, the plane of rotation. In other words, the first acceleration sensor 121 measures acceleration in the first direction and outputs a first acceleration value, and the second acceleration sensor 122 measures acceleration in the second direction that is different from the first direction and outputs a second acceleration value. The first direction and the second direction may have an angle difference between 0 degree and 180 degree, but are preferably perpendicular to each other. More preferably, as illustrated in FIG. 2, the first direction is a tangential direction T of the wheel 510 and the second direction is a radial or centrifugal direction R of the wheel 510. In this case, the first acceleration sensor 121 senses a moving acceleration of the car, and the second acceleration sensor 122 senses a rotation speed of the wheel. FIG. 2 shows a right wheel rotating clockwise CW when the car moves forward. From a viewpoint of an observer, a left wheel rotates counterclockwise CCW during the forward movement, and a polarity of the acceleration measured by the first acceleration sensor 121 is inverted.

Figure 3:
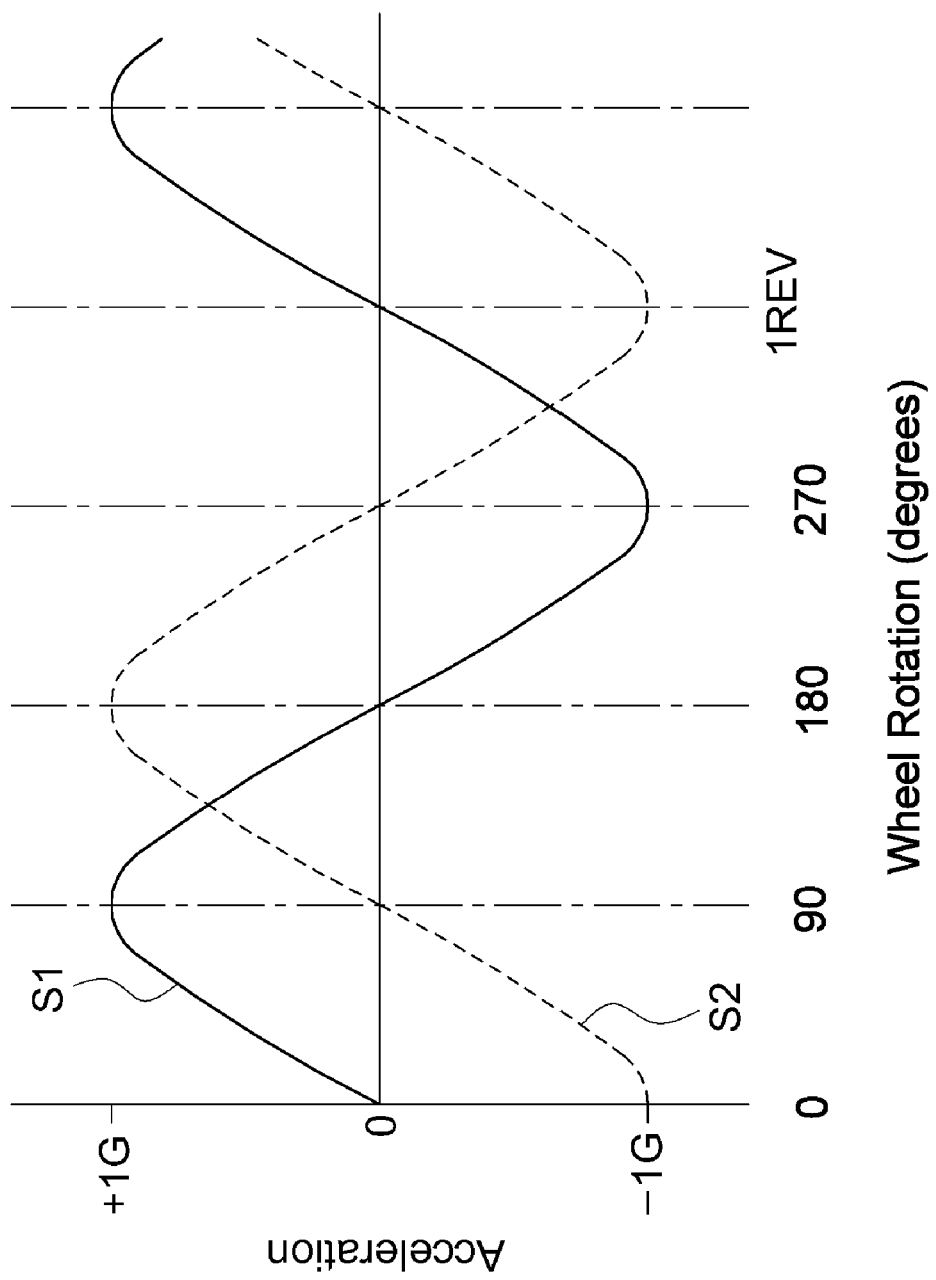
FIG. 3 is a graph of signals output from two orthogonal acceleration sensors according to an embodiment of the present invention.

Among signals of an acceleration sensor generated while the wheel 510 of FIG. 2 rotates, a signal caused by the acceleration of gravity is shown in FIG. 3. In FIG. 3, the phase of a tangential direction sensor signal S1 leads that of a radial direction sensor signal S2 by 90 degrees, the wheel 510 is identified as a right wheel. When the phase relationship is reversed, the wheel 510 is identified as a left wheel. The acceleration sensors used here are transducers generating an electric signal in proportion to an applied force. The transducers can be manufactured as piezoelectric devices, but are not limited to piezoelectric devices. FIG. 3 shows an example of voltage signals corresponding to acceleration values alternating between +1G (=9.81 m/s$^2$) and −1G according to rotation of a wheel, and it should be understood that a centrifugal force according to rotation of the wheel and an acceleration value according to the car movement are cancelled out through bias-compensation calculation processes. The signals of FIG. 3 may be digital signals extracted after amplification and filtering as necessary. Such a measured acceleration value has the maximum value when the measurement direction of an acceleration sensor coincides with the gravity direction, the minimum value when the measurement direction is opposite to the gravity direction, and a value of zero when the measurement direction is perpendicular to the gravity direction. One cycle of the measured value corresponds to one revolution (1 REV or 360°) of the wheel.

In a known method, the tire monitoring device 100 can determine whether it is installed on the left or right side using the both acceleration sensors 121 and 122, and these auto-location algorithms in detail can be found in prior art.

Once auto-location of a tire is completed using signals of both acceleration sensors 121 and 122, an auto-location operation does not need to be repeated unless a tire event like tire replacement or tire exchange occurs. Thus, in the present invention, auto-location is performed only when a tire event occurs, thereby reducing energy consumption required for unnecessary repetition of auto-location and the calculation load of a control circuit.

Figure 4:
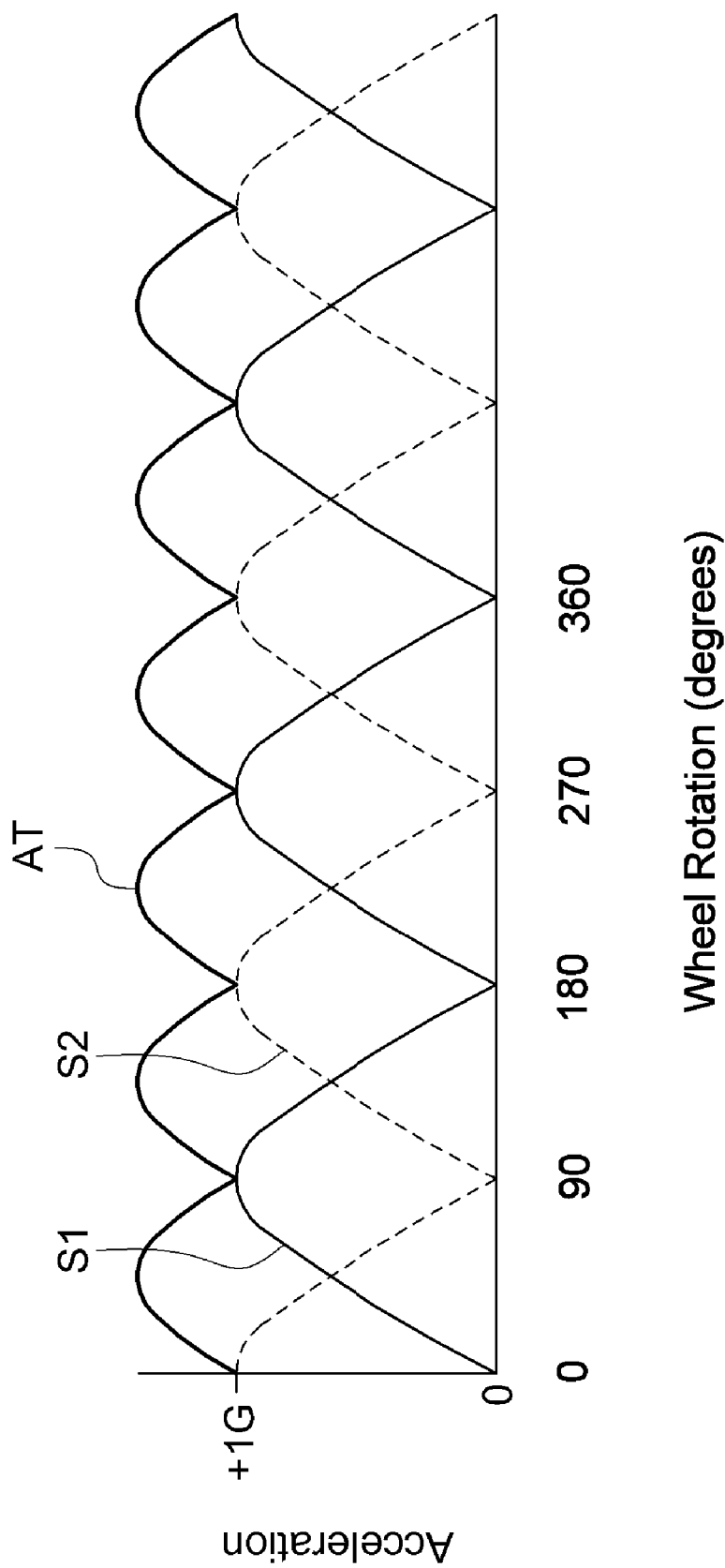
FIG. 4 is a graph of a value calculated using measured acceleration values according to an embodiment of the present invention.

When a wheel is installed in a car in an operable condition, accelerations measured by the first acceleration sensor 121 and the second acceleration sensor 122 are as shown in FIG. 3. Thus, a calculated value AT obtained using an operator summing the absolute values of the both measured values S1 and S2 (AT=|S1|+|S2|) is the uppermost line of FIG. 4. Therefore, a calculated value obtained using the operator of FIG. 4 is equal to or larger than 1G regardless of the angle of rotation of the installed wheel.

However, when tire exchange or replacement operations occur, the tire is laid down on the ground. At this time, the acceleration measurement directions of both the first acceleration sensor 121 and the second acceleration sensor 122 are perpendicular to the gravity direction, and thus the calculated value obtained by the above operator becomes ideally zero.

Thus, when a determination reference value SP (set-point) is chosen between zero and 1G by taking a measurement error and a case in which the tire is not completely laid down on the ground into consideration, it is possible to determine whether or not a tire replacement event or a tire exchange event has occurred according to a result of comparing the calculated value with the reference value.

Figure 5:
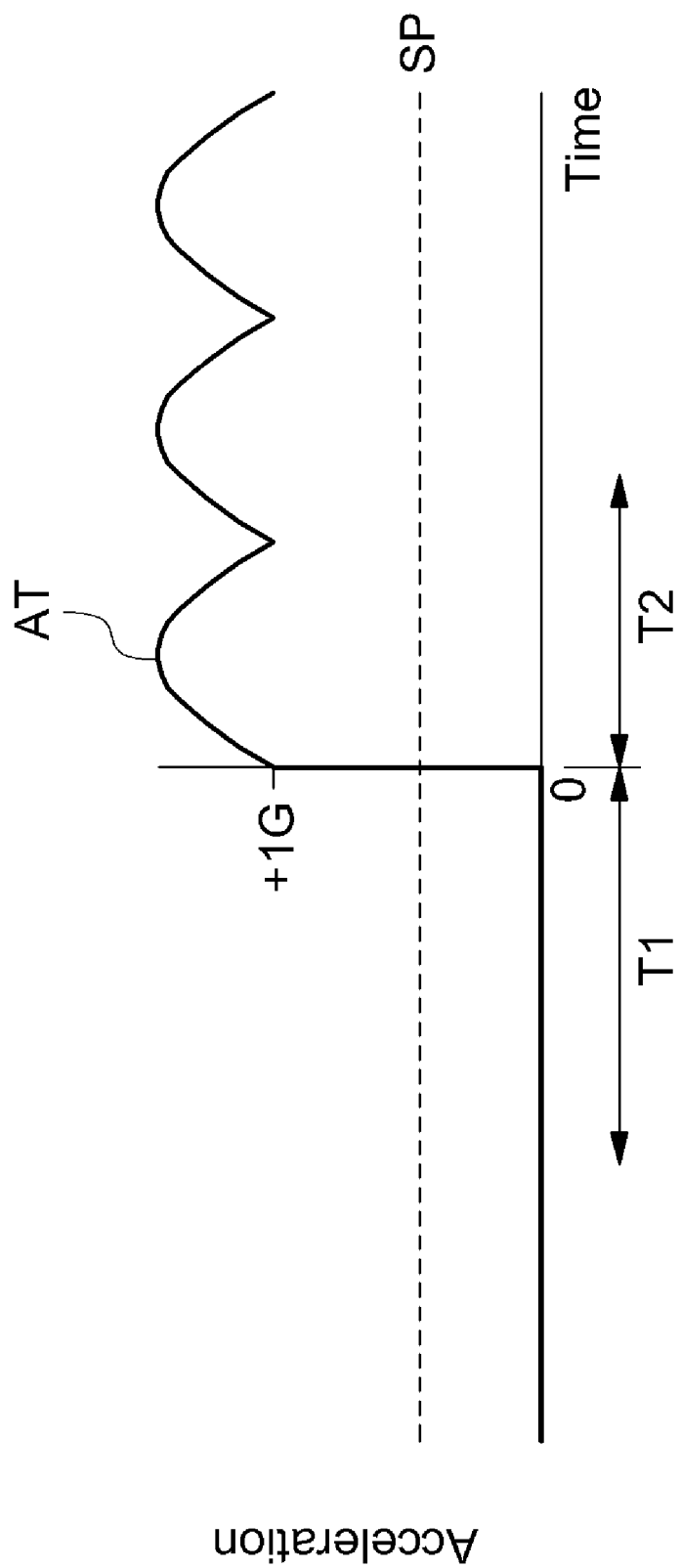
FIG. 5 illustrates a reference time and reference value at which an auto-location process is performed according to an embodiment of the present invention.

FIG. 5 shows a simplified graph for change in the calculated value while a car moves after a tire replacement or tire exchange event. FIG. 5 illustrates a case in which a tire replacement operation is completed and movement is started at time zero.

The calculated value may momentarily become low due to noise. Thus, when the calculated value is maintained equal to or less than the reference value SP for duration of a first period T1 corresponding to the minimum period required for a tire replacement or exchange operation, it is determined that a tire event has occurred, and a tire event flag of 1 (ONE) is stored in the memory. If the calculated value is equal to or larger than the reference value SP for duration of a second period T2 with the tire event flag maintained at 1 in the memory, the controller 140 determines that the tire has been re-installed after the tire event, and starts to perform an auto-location operation of recognizing whether an RF transmitter is on the left or right side. T2 may be set to be shorter than T1. After the auto-location operation is completed, a transmission mode can be changed by altering an information transmission period or the amount of transmission information relating to auto-location for a predetermined period.

After a series of operations relating to recognition of whether an RF transmitter is on the left or right side are completed, the tire event flag of the memory is restored to 0. When the tire event flag of the memory is 0, operation relating to auto-location is switched to a sleep mode, and battery consumption is minimized.

In the above example, the operator of the both acceleration sensors is the sum of the absolute values of the both measured values. However, the operator of the values measured by the acceleration sensors can be easily modified to distinguish a case in which a tire is installed in a car and stands upright and a case in which the tire is separated from the car and laid down on the ground for replacement or exchange. In the above example, one reference value is used, but it is possible to set two different reference values, one for determining a separated state of a tire and the other for determining an installed state of a tire.

The device according to an embodiment of the present invention performs minimum operation required for automatic tire location recognition, thereby minimizing battery consumption, reducing the calculation load of a tire monitoring device and a central control unit, and reducing mis-operations caused by noise.

While the invention has been shown and described with reference to certain example embodiments thereof, it will be understood by those skilled in the art that various changes in form and details may be made therein without departing from the spirit and scope of the invention as defined by the appended claims.

What is claimed is:

1. A tire monitoring system for a vehicle, comprising:
a plurality of tire monitoring devices each comprising:
a first acceleration sensor and a second acceleration sensor respectively configured to measure accelerations in first and second directions on a plane perpendicular to a wheel axis,
an RF transmitter, and
a controller configured to determine whether a wheel is on a left or right side of a vehicle on the basis of a relationship between alternating signals of the first acceleration sensor and the second acceleration sensor, determine a calculated value based on the measured accelerations in the first direction and the second direction and determine whether or not a tire event has occurred based on the calculated value of the accelerations measured by the first acceleration sensor and the second acceleration sensor, and attached to wheels; and
a central control unit mounted on the vehicle and including a receiver receiving a signal from the RF transmitter.

2. The tire monitoring system of claim 1, wherein the first direction is a tangential direction of the wheels, and the second direction is a centrifugal direction of the wheels.

3. The tire monitoring system of claim 1, wherein the controller starts an operation of recognizing whether the tire is on the left or right side or controls a transmission mode of the RF transmitter according to whether or not a tire event has occurred.

4. The tire monitoring system of claim 1, wherein: the calculated value is a sum of absolute values of the accelerations measured by the first acceleration sensor and the second acceleration sensor, and the controller determines that a tire event has occurred when the calculated value is equal to or less than a reference value for duration of a first period.

5. The tire monitoring system of claim 4, wherein when a tire event has occurred and the calculated value is equal to or larger than the reference value for duration of a second period, the controller performs an operation of recognizing whether the RF transmitter is on the left or right side of the vehicle.

6. A tire monitoring device, comprising:
a first acceleration sensor and a second acceleration sensor respectively configured to measure accelerations in a first direction and a second direction;
a radio frequency (RF) transmitter configured to transmit measured values of the acceleration sensors; and
a controller configured to determine a calculated value based on the measured accelerations in the first direction and the second direction and determine whether or not a tire event has occurred based on the calculated value.

7. The tire monitoring device of claim 6, wherein the first direction and the second direction are perpendicular to each other.

8. The tire monitoring device of claim 6, wherein: the controller has a memory having a tire event field whose flag value varies according to whether or not a tire event has occurred, and the controller checks the tire event field to start an operation of recognizing whether a tire is on a left or right side or control a transmission mode of the RF transmitter.

9. The tire monitoring device of claim 6, wherein: the calculated value is a sum of absolute values of the accelerations measured by the first acceleration sensor and the second acceleration sensor, and the controller determines that a tire event has occurred when the calculated value is equal to or less than a reference value for duration of a first period.

10. The tire monitoring device of claim 9, wherein: when a tire event has occurred and the calculated value is equal to or larger than the reference value for duration of a second period, the controller performs an operation of recognizing whether the RF transmitter is on the left or right side of a vehicle on which the tire monitoring device is mounted.

11. The tire monitoring device of claim 6, wherein:
the first acceleration sensor outputs a first acceleration value; the second acceleration sensor outputs a second acceleration value;
the calculated value is a sum of the absolute values of the first acceleration value and the second acceleration value;
the controller is configured to determine whether the calculated value is equal to or less than a reference value for duration of a first period; and
if the calculated value is equal to or less than the reference value for duration of a first period, the controller sets a flag to indicate that a tire event has occurred, the tire event signifying at least one of a tire exchange and a tire replacement.

12. A tire monitoring system for a vehicle having a plurality of wheels, comprising:
a plurality of tire monitoring devices each coupled to a wheel, each tire monitoring device comprising:
a first acceleration sensor and a second acceleration sensor respectively configured to measure accelerations in a first direction and a second direction on a plane;
a radio frequency (RF) transmitter configured to transmit measured values of the acceleration sensors; and
a controller configured to determine a calculated value based on the measured accelerations in the first direction and the second direction and determine whether or not a tire event has occurred with based on the calculated value; and
a central control unit mounted on the vehicle, the central control unit including a receiver configured to receive signals from the RF transmitter of each tire monitoring device.

13. The tire monitoring system of claim 12, wherein: if a tire event has occurred, the controller starts an operation of recognizing whether the tire is on the left or right side of the vehicle.

14. The tire monitoring system of claim 12, wherein:
the first acceleration sensor outputs a first acceleration value;
the second acceleration sensor outputs a second acceleration value;
the calculated value is a sum of the absolute values of the first acceleration value and the second acceleration value;

the controller is configured to determine whether the calculated value is equal to or less than a reference value for duration of a first period; and if the calculated value is equal to or less than the reference value for duration of a first period, the controller sets a flag to indicate that a tire event has occurred, the tire event signifying at least one of a tire exchange and a tire replacement.

15. The tire monitoring system of claim 14, wherein: when a tire event has occurred and the calculated value is equal to or larger than the reference value for duration of a second period, the controller performs an operation of recognizing whether the RF transmitter is on the left or right side of the vehicle.

16. The tire monitoring device of claim 6, wherein the calculated value varies based on the measured accelerations in the first direction and the second direction with respect to a gravity direction.

17. The tire monitoring device of claim 16, wherein the controller is further configured to determine that the tire event occurred when the first direction and the second direction is perpendicular to the gravity direction.

18. The tire monitoring device of claim 16, wherein the controller is further configured to determine that the tire event occurred when the calculated value is between zero and 1G.

19. The tire monitoring device of claim 6, wherein when the tire monitoring device is coupled to a wheel, the calculated value indicates an orientation of the wheel, thereby indicating whether the tire event has occurred.

20. The tire monitoring device of claim 6, wherein when the tire monitoring device is coupled to a wheel, the first acceleration sensor is configured to measure accelerations in the first direction that is tangential with respect to the wheel and the second acceleration sensor is configured to measure accelerations in the second direction that is radial with respect to the wheel.

* * * * *